(12) United States Patent
Smith et al.

(10) Patent No.: US 11,034,275 B1
(45) Date of Patent: Jun. 15, 2021

(54) SYSTEM FOR A STOWABLE VEHICLE RAMP

(71) Applicants: Clarence Smith, Grandview, MO (US); Rhonda Harper-Smith, Grandview, MO (US)

(72) Inventors: Clarence Smith, Grandview, MO (US); Rhonda Harper-Smith, Grandview, MO (US)

( * ) Notice: Subject to any disclaimer, the term of this patent is extended or adjusted under 35 U.S.C. 154(b) by 8 days.

(21) Appl. No.: 16/661,392

(22) Filed: Oct. 23, 2019

(51) Int. Cl.
*B60P 1/43* (2006.01)

(52) U.S. Cl.
CPC .................................... *B60P 1/431* (2013.01)

(58) Field of Classification Search
CPC ..................................................... B60P 1/431
See application file for complete search history.

(56) References Cited

U.S. PATENT DOCUMENTS

| | | | | |
|---|---|---|---|---|
| 5,829,945 | A * | 11/1998 | Stanley | B60P 1/003 414/477 |
| 5,832,555 | A * | 11/1998 | Saucier | A61G 3/061 14/71.1 |
| 6,059,344 | A | 5/2000 | Radosevich | |
| 7,264,433 | B2 * | 9/2007 | Navarro | B60P 1/431 414/537 |
| 7,513,552 | B2 | 4/2009 | Carvalho | |
| 8,794,859 | B1 * | 8/2014 | Patterson | B29C 49/78 403/102 |
| 2008/0150311 | A1 * | 6/2008 | Quigley | B62D 33/03 296/57.1 |
| 2015/0086313 | A1 * | 3/2015 | Perez | B60R 9/06 414/537 |

\* cited by examiner

*Primary Examiner* — Jonathan Snelting

(57) ABSTRACT

A system for a stowable vehicle ramp including a vehicle assembly, a ramp assembly and a control assembly is disclosed. The ramp assembly includes a ramp that is automatically or manually extended out, and either stowed under or inlayed in the bed of a vehicle of the vehicle assembly such as a truck or pickup truck. It is possible to retrofit the ramp onto existing vehicles such as pickups or trucks. The stowable ramp aids in providing easy loading access to the bed of the vehicle for smaller vehicles needing transportation.

5 Claims, 4 Drawing Sheets

SYSTEM FOR A STOWABLE VEHICLE RAMP

BACKGROUND OF THE INVENTION

1. Field of the Invention

The present invention relates to ramp for vehicles and, more particularly, to a ramp for vehicles that is easily stowable to aid in easy loading access to the vehicle.

2. Description of the Related Art

Several designs for a ramp for vehicles have been designed in the past. None of them, however, include a ramp that is automatically or manually extended out, and either stowed under or inlayed in the bed of a vehicle such as a truck or pickup truck.

Applicant believes that a related reference corresponds to U.S. Pat. No. 6,059,344 for a pickup tailgate ramp. Another related reference corresponds to U.S. Pat. No. 7,513,552 for a transformable tail gate for a truck bed. None of these references, however, teach of an automated ramp combined with being under or inlayed in the bed of the truck.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of this invention to provide a stowable ramp that can be retrofitted onto existing vehicles such as pickups or trucks.

It is another object of the present invention to provide a stowable ramp that can be mounted underneath or inlayed in the bed of vehicles.

It is another one of the objects of the present invention to provide a stowable ramp that can be expanded and retracted by either automatic or manual means.

It is still another object of the present invention to provide a stowable ramp that aids in providing easy loading access to the bed of a vehicle for smaller vehicles needing transportation.

It is yet another object of this invention to provide such a stowable ramp that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
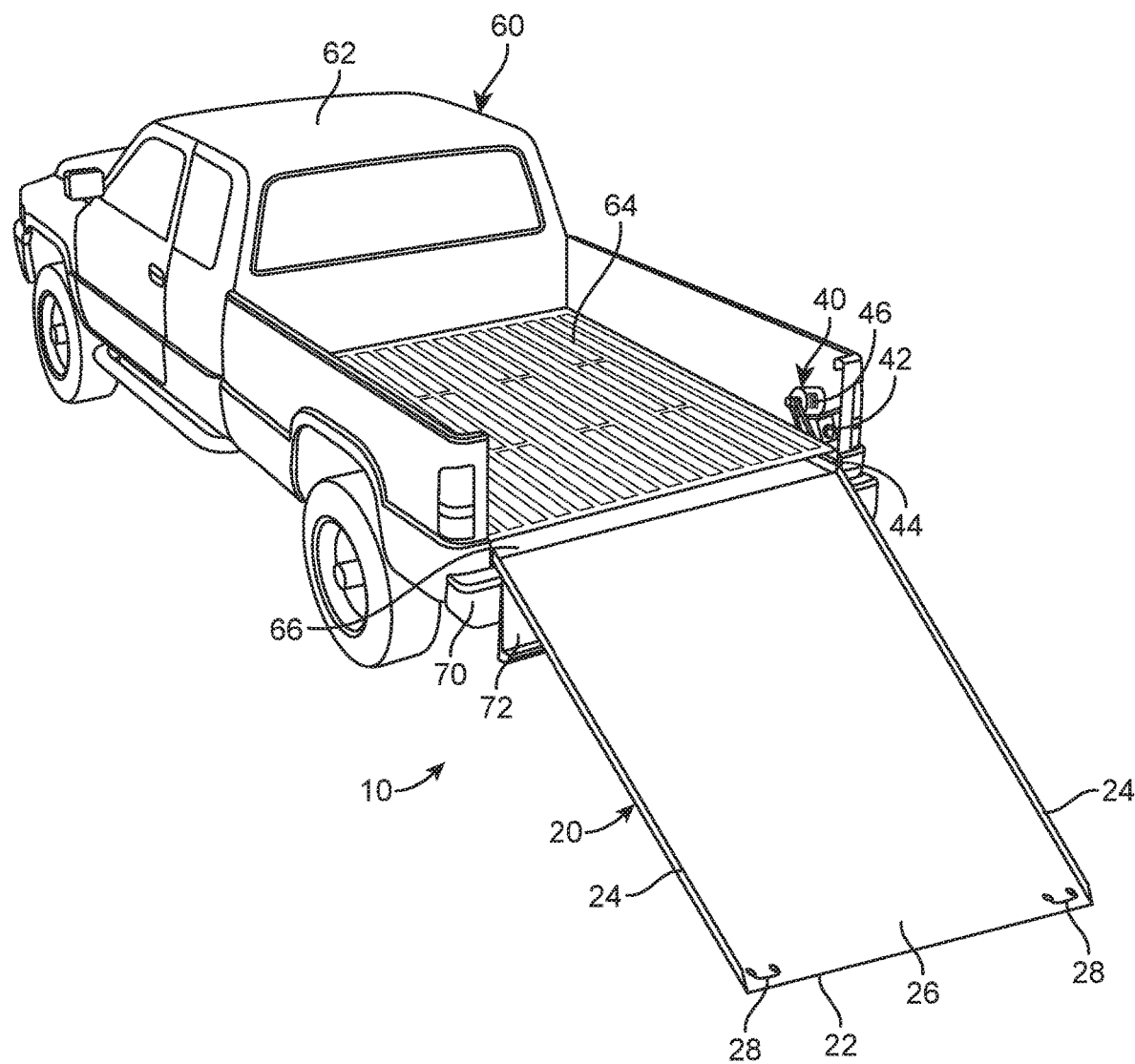
FIG. 1 represents an isometric view of the present invention inlayed into the bed of a vehicle such as a pickup in an opened configuration.

Referring now to the drawings, where the present invention is generally referred to with numeral 10, it can be observed that it, a vehicle ramp 10, basically includes a ramp assembly 20, a control assembly 40 and a control assembly 60.

Figure 2:
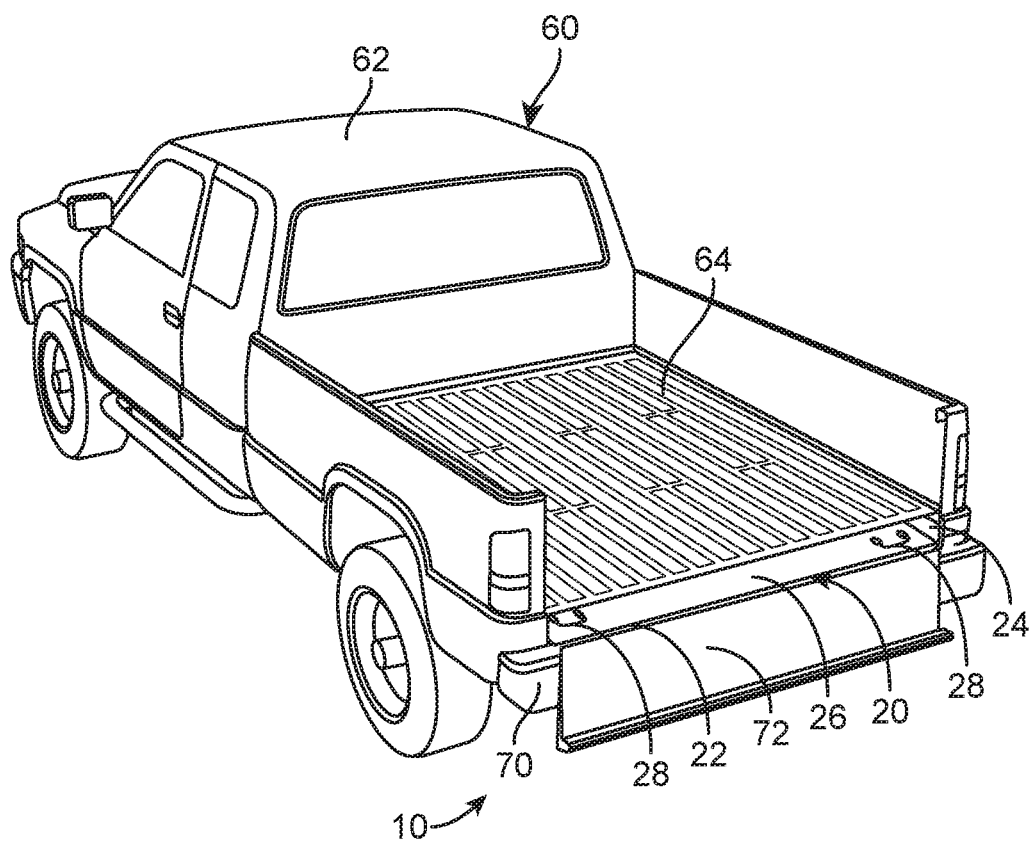
FIG. 2 shows the present invention stored in the bed of a vehicle, meaning in a closed configuration.
Figure 3:
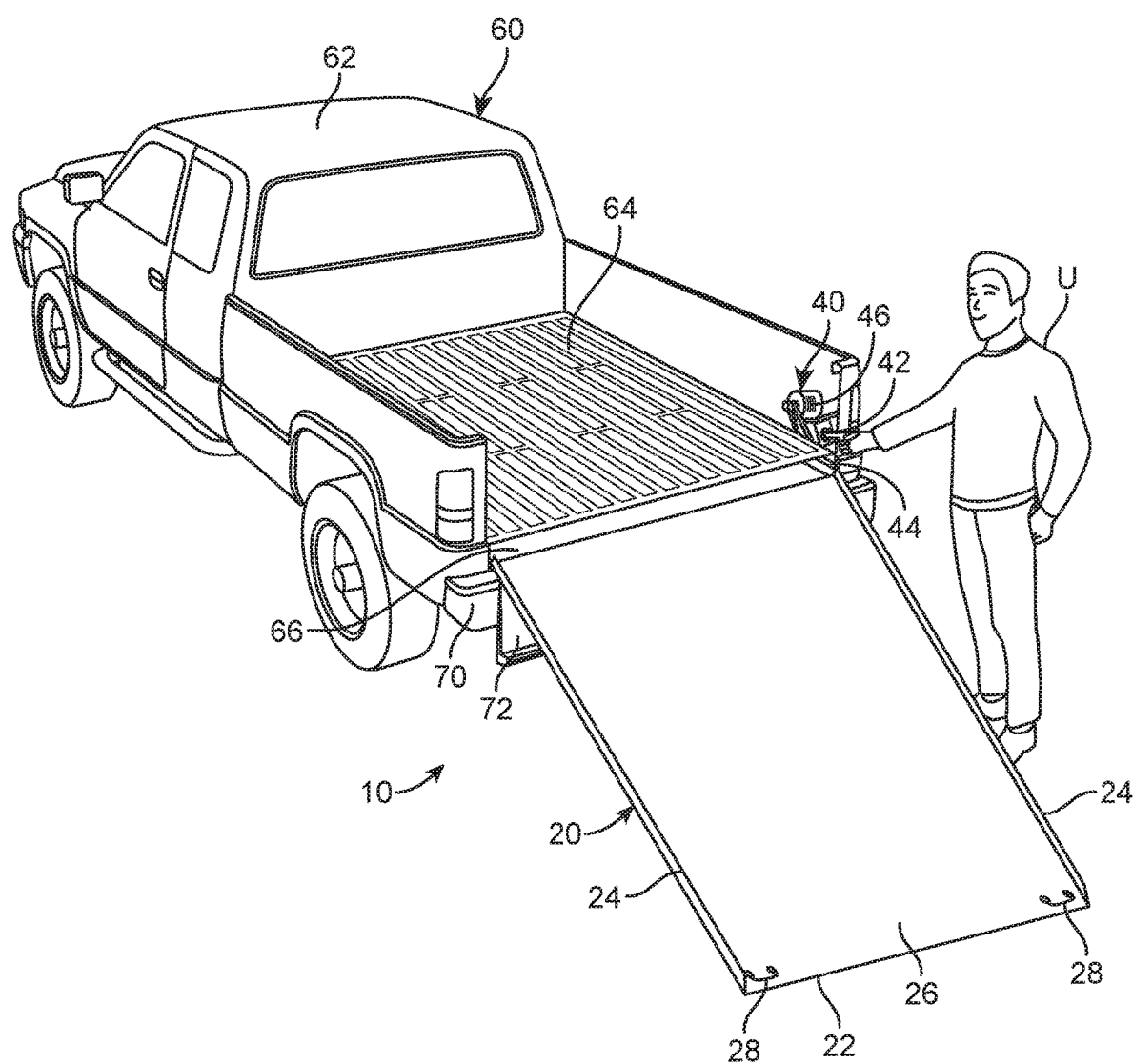
FIG. 3 illustrates the present invention being operated by a user.
Figure 4:
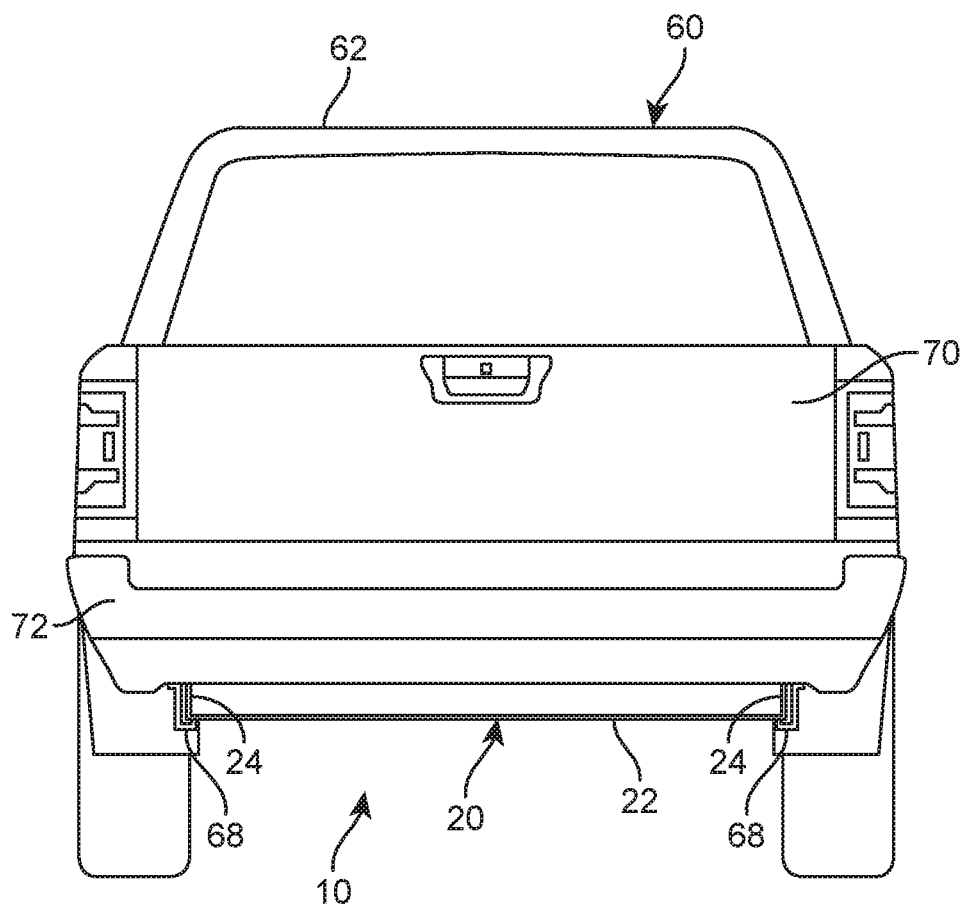
FIG. 4 is a representation of the present invention in a closed configuration stored underneath the bed of vehicle such as a pickup.

Referring to FIGS. 1-4, it can be seen that the present invention, vehicle ramp 10, can be seen in the immediate embodiment. Vehicle ramp 10 includes ramp assembly 20 having a stowable ramp 22. Stowable ramp 22 may be inlayed into a cargo bed 64 of a vehicle 62 of a vehicle assembly 60, in one embodiment. Stowable ramp 22 inlayed into cargo bed 64 is the preferred embodiment. It is possible to inlay stowable ramp 22 into cargo bed 64 with the use of a ramp opening 66 located at a front side of cargo bed 64 adapted to receive and secure stowable ramp 22 therein. Stowable ramp 22 may be flush with cargo bed 64 when stored in ramp opening 66. In one embodiment, stowable ramp may extend and retract from ramp opening 66 with the use of a handle 28. Handle 28 may be used when stowable ramp 22 is extended and retracted via manual means. In an alternate embodiment, stowable ramp 22 may be mounted underneath of vehicle 62 cargo bed 64 with the use of brackets 68 or other attaching means as known in the art such as fasteners, welding, hinges or the like. In an alternate embodiment, it may also be suitable to mount stowable ramp 22 underneath of a tailgate 72 and above of a rear bumper 70 of vehicle 62. Stowable ramp 22 may be of predetermined dimensions as to be retrofitted into cargo bed 64 of existing vehicles. Stowable ramp 22 may extend a predetermined length of cargo bed 64. It may be suitable for stowable ramp 22 to be made of strong and sturdy materials as to be durable and capable of supporting weight, especially heavy weight, thereon of a top surface 26 thereof. Stowable ramp 22 may be made of made of aluminum, metal, steel, plastic or combinations thereof. Top surface 26 may provide a path or walkway for easy access of cargo bed 64 for objects, especially heavy objects, needing mounting onto cargo bed 64 for transporting thereof. On each of the peripheral sides of stowable ramp 22 may be sidewalls 24 extending upwardly from top surface 26. Sidewalls 24 may be adapted to guide objects thereon top surface 26 to stay within the bounds of stowable ramp 22. Sidewalls 24 may extend upwardly a predetermined distance or amount. In one embodiment, sidewalls 24 may extend along an entire length of stowable ramp 22. It should be understood that sidewalls 24 may be made of a same material as stowable ramp 22. In one embodiment, sidewalls 24 may be an integral part of stowable ramp 24.

In order to control and operate ramp assembly 20, control assembly 40 may be used. Ramp assembly 20 and more specifically stowable ramp 22 can be extracted and retracted via automatic or manual means. Stowable ramp 22 therefore has an opened and a closed configuration. The opened configuration is achieved once stowable ramp 22 is fully extended. When stowable ramp 22 is fully extended a front end of stowable ramp 22 may make contact with a ground surface for proper stability. Thereby allowing for stowable ramp 22 to safely and securely hold a weight thereon top surface 26 as access to cargo bed 64 is being achieved. The closed configuration for stowable ramp 22 is achieved once stowable ramp 22 is entirely retracted. Control assembly 40 allows for stowable ramp 22 to go from the opened configuration to the closed configuration of vice versa via automatic means. Control assembly 40 includes a controller 42 that can be operated to actuate stowable ramp 22. In one embodiment, controller 42 may be operated wirelessly by a mobile device to allow for remote control of stowable ramp 22 from the open and closed configuration or vice versa. Controller 42 may be mounted at a predetermined location on vehicle 60. It may be suitable for controller 42 to be mounted virtually anywhere on an interior or exterior of vehicle 62. Controller 42 may be a button that is pressed. The controlling of ramp assembly 20 with control assembly 40 is possible because ramp assembly 20 and control assembly 40 are interconnected.

Control assembly 40 may include tracking members 44 that is mounted at predetermined locations to stowable ramp 22 of ramp assembly 20. Tracking members 44 may be a rail or track, in one embodiment. Upon controller 42 being operated, a motor 46 of controller assembly 40 may actuate tracking members 44 to move stowable ramp 22 either in a forward or backward direction for achieving the opened or closed configuration of stowable ramp 22. In one embodiment, motor 46 may be powered by a battery. In an alternate embodiment, motor 46 may be solar powered by solar panels mounted thereon vehicle 62.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a vehicle ramp, consisting of:
   a. a ramp assembly including a stowable ramp having a uniform top surface bounded by lateral sidewalls, a front edge and a rear edge, wherein said sidewalls include a distal tapered edge with respect to the rear edge, the uniform top surface including two handles mounted to a front end of said uniform top surface at opposing corners thereof, said two handles being a U-shaped member, said sidewalls extending upwardly from said top surface, said stowable ramp having an extended and retracted configuration; and
   b. a control assembly including a controller, tracking members and a motor, said tracking members mounted at predetermined locations to said stowable ramp, said motor being actuated by said controller to move said tracking members in either a forward or backward direction, said tracking members moving in said forward direction results in said stowable ramp achieving said extended configuration, said tracking members moving in said backward direction results in said stowable ramp achieving said retracted configuration, said stowable ramp is flush with said cargo bed when said stowable ramp is stored within said cargo opening when in the closed configuration;
   c. a vehicle assembly including a vehicle having a cargo bed, a rear bumper and a tailgate, said cargo bed being an enclosure with an open top wall and four lateral walls, said control assembly being internally mounted to a lateral wall of the cargo bed, said cargo bed creating a top boundary of a ramp opening, said stowable ramp being entirely above said rear bumper while in the retracted configuration, said cargo bed having a ramp opening at a front side of said cargo bed to receive and secure said stowable ramp therein, said ramp opening is constantly exposed when the tailgate is ajar.

2. The system of claim 1, wherein said stowable ramp is made of aluminum, metal, steel, plastic or combinations thereof.

3. The system of claim 1, wherein said stowable ramp can be operated manually or automatically.

4. The system of claim 1, wherein said controller is stored within an interior of said vehicle.

5. The system of claim 1, wherein said controller is operated wirelessly to control said stowable ramp from the extended and the retracted configuration.

\* \* \* \* \*